(12) United States Patent
Du et al.

(10) Patent No.: US 10,042,447 B2
(45) Date of Patent: Aug. 7, 2018

(54) TOUCH SENSOR HAVING SINGLE ITO LAYER, MANUFACTURING METHOD THEREOF AND TOUCH SCREEN

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Zhi Du, Beijing (CN); Ming Hu, Beijing (CN)

(73) Assignees: BOE TECHNOLOGY GROUP, CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 81 days.

(21) Appl. No.: 15/122,368

(22) PCT Filed: May 15, 2015

(86) PCT No.: PCT/CN2015/079011
§ 371 (c)(1),
(2) Date: Aug. 29, 2016

(87) PCT Pub. No.: WO2016/095419
PCT Pub. Date: Jun. 23, 2016

(65) Prior Publication Data
US 2016/0370890 A1 Dec. 22, 2016

(30) Foreign Application Priority Data
Dec. 17, 2014 (CN) .......................... 2014 1 0782628

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 2203/04103* (2013.01)

(58) Field of Classification Search
None
See application file for complete search history.

(56) References Cited

U.S. PATENT DOCUMENTS

2011/0318553 A1* 12/2011 Lotz ........................ C23C 14/34
428/212
2013/0213703 A1* 8/2013 Kawaguchi ......... C23C 14/0042
174/257

(Continued)

FOREIGN PATENT DOCUMENTS

| CN | 102026490 A | 4/2011 |
| CN | 202771813 U | 3/2013 |

(Continued)

OTHER PUBLICATIONS

Second Chinese Office Action, for Chinese Patent Application No. 201410782628.1, dated Apr. 25, 2017, 12 pages.

(Continued)

*Primary Examiner* — Shamim Ahmed
(74) *Attorney, Agent, or Firm* — Kinney & Lange, P.A.

(57) ABSTRACT

A method for manufacturing a touch sensor having a single ITO layer is disclosed by the invention, including steps of: a) performing cleaning processing on a glass substrate; b) forming an index matching layer on the glass substrate, portions of the index matching layer corresponding to sensor cutting marks and sensor binding regions being at least partially removed, via a peelable adhesive disposed at sites corresponding to the sensor cutting marks and the sensor binding regions on the glass substrate or the index matching layer; c) forming an ITO layer on the partially removed index matching layer; and d) etching the ITO layer so as to form an pattern of the single ITO layer of the touch sensor.

(Continued)

A touch sensor having a single ITO layer manufactured by the method and a touch screen including the touch sensor are further disclosed by the invention.

16 Claims, 4 Drawing Sheets

(56) References Cited

U.S. PATENT DOCUMENTS

| | | | | |
|---|---|---|---|---|
| 2014/0267955 A1* | 9/2014 | Hibayashi | ............. | G06F 3/0412 |
| | | | | 349/12 |
| 2015/0370395 A1* | 12/2015 | Hsu | ............. | G06F 3/0412 |
| | | | | 345/174 |
| 2016/0084991 A1* | 3/2016 | Umemoto | ............ | G02B 1/111 |
| | | | | 359/609 |

FOREIGN PATENT DOCUMENTS

| CN | 202854788 U | 4/2013 |
|---|---|---|
| CN | 103257746 A | 8/2013 |
| CN | 10335315 A | 10/2013 |
| CN | 103412661 A | 11/2013 |
| CN | 104391609 A | 3/2015 |

OTHER PUBLICATIONS

First Chinese Office Action including English translation dated Dec. 2, 2016, for corresponding Chinese Application No. 201410782628.1.

International Search Report and Written Opinion from PCT Application Serial No. PCT/CN2015/079011, dated Sep. 30, 2015, 10 pages.

\* cited by examiner

TOUCH SENSOR HAVING SINGLE ITO LAYER, MANUFACTURING METHOD THEREOF AND TOUCH SCREEN

CROSS-REFERENCE TO RELATED APPLICATION

This application claims the benefit of Chinese Patent Application No. 201410782628.1 filed on Dec. 17, 2014 in the State Intellectual Property Office of China, the whole disclosure of which is incorporated herein by reference.

BACKGROUND OF THE INVENTION

Field of the Invention

Embodiments of the present invention relate to the technical field of touch sensor for touch screen, and in particular to a touch sensor having a single ITO layer, a manufacturing method thereof and a touch screen having the same.

Description of the Related Art

In the prior art, a touch technology with a single layer of Indium Tin Oxide (abbreviated as ITO hereinafter) is widely used in the manufacturing touch screens due to several advantages such as low cost, capability of achieving multi-touch, and so on. So-called single ITO layer touch sensor refers to a touch sensor which is formed by plating an ITO layer onto a glass or plastic substrate and etching the ITO layer into electrodes. In such a touch sensor, the ITO electrodes may function not only as driving electrodes but also as sensing electrodes, facilitating a touch function without any other film layer.

However, on the one hand, since a refractive index of the ITO differs largely from that of the glass substrate (the refractive index of the ITO is on the order of 1.9-2.0, while the refractive index of the glass substrate is about 1.52), resulting in a significant difference in the reflectivity between an ITO area and an ITO-free area after circuits are formed by etching, and in turn highlighting the etched circuits so as to affect the visual feeling of its user. On the other hand, as far as a majority among all types of sensors used for touch screen, due to the existence of metallic layer, both sensor cutting marks and sensor binding regions are formed by etching the metallic layer and thus may be easily identified by CCD lens, i.e., there is no difficulty in alignment. However, as to a touch sensor with a single ITO layer, since there is no such metallic layer, both sensor cutting marks and sensor binding regions are formed by ITO and these cutting marks and binding regions subsequently become less apparent after ITO is processed by shadow elimination, such that these sensor cutting marks and sensor binding regions may not be identified by CCD lens during the cutting and the binding processes, resulting in that the individual sensors arranged on the glass substrate may not be cut and bound.

Therefore, as to a touch sensor with a single ITO layer, there is a problem to be solved for those skilled in the art, i.e., how to ensure that the sensor cutting marks and sensor binding regions may be easily identified when conducting shadow elimination thereon.

SUMMARY OF THE INVENTION

Embodiments of the present invention have been made to overcome or alleviate at least one aspect of the above mentioned disadvantages and/or shortcomings, by providing a method for manufacturing a touch sensor having a single ITO layer, by which method it is ensured that the sensor cutting marks and sensor binding regions may be easily identified when conducting shadow elimination on the touch sensor having a single ITO layer.

Following technical solutions are adopted in exemplary embodiments of the invention for achieving the above desired technical purposes.

According to a first aspect of the embodiments of the present invention, it is provided a method for manufacturing a touch sensor having a single ITO layer, comprising the steps of:

a) performing cleaning processing on a glass substrate;

b) forming an index matching layer on the glass substrate, comprising forming an entire indexing matching layer across the glass substrate, and a peelable adhesive at sites corresponding to the sensor cutting marks and the sensor binding regions on the glass substrate or the index matching layer, and then at least partially removing portions of the index matching layer corresponding to sensor cutting marks and sensor binding regions being at least partially removed, by peeling away the peelable adhesive;

c) forming an ITO layer on the partially removed index matching layer; and d) etching the ITO layer so as to form an pattern of the single ITO layer of the touch sensor.

According to a second aspect of the embodiments of the present invention, it is further provided a touch sensor having a single ITO layer, the touch sensor being manufactured by the method as above, wherein portions of the index matching layer corresponding to sensor cutting marks and sensor binding regions are at least partially removed.

According to a third aspect of the embodiments of the present invention, it is provided a touch screen, comprising the touch sensor having a single ITO layer as above.

BRIEF DESCRIPTION OF THE DRAWINGS

The above and other features and advantages of the present invention will become more apparent and a more comprehensive understanding of the present invention can be obtained, by describing in detail exemplary embodiments thereof with reference to the accompanying drawings, in which.

DETAILED DESCRIPTION OF PREFERRED EMBODIMENTS OF THE INVENTION

Figure 1:
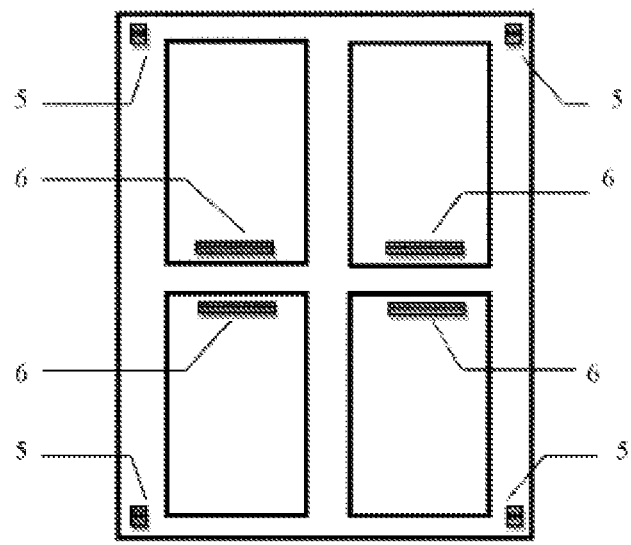
FIG. 1 illustrates a schematic view of a glass substrate for manufacturing a touch sensor having a single ITO layer according to an exemplary embodiment of the invention, a peelable adhesive being printed at sites of the sensor cutting marks and the sensor binding regions on the glass substrate (as illustrated by the shadows)

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the invention in view of attached drawings should not be construed as being limited to the embodiment set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective thickness and shape of each layer are only intended to exemplarily illustrate the contents of the disclosure, rather than to demonstrate the practical dimension or proportion of the laminated structure.

According to a general technical concept of the present invention, there is provided a method for manufacturing a touch sensor having a single ITO layer by the embodiments of the invention, comprising steps of:

a) performing cleaning processing on a glass substrate;

b) forming an index matching layer on the glass substrate, portions of the index matching layer corresponding to sensor cutting marks and sensor binding regions being at least partially removed, via a peelable adhesive disposed at sites corresponding to the sensor cutting marks and the sensor binding region on the glass substrate or the index matching layer;

c) forming an ITO layer on the removed index matching layer; and d) etching the ITO layer so as to form an pattern of the single ITO layer of the touch sensor.

In the method according to the general technical concept of the embodiments of the invention, various sensors disposed on the glass substrate may be cut and bound accurately by setting up the index matching layer. Meanwhile, a forming process of the peelable adhesive is introduced before film-coating of the index matching layer; hereby, as to the single ITO layer touch sensor using the shadow elimination technology for ITO, during the cutting and binding processes of a sensor array on its glass substrate, the problem of difficulty in alignment (during the cutting and the binding) due to unidentifiable alignment marks and binding regions patterns by CCD lens after the shadow elimination may be solved.

In an exemplary embodiment, the index matching layer for the shadow elimination comprises a $Nb_2O_5$ layer and a $SiO_2$ layer. Moreover, the $SiO_2$ layer is provided above the $Nb_2O_5$ layer, i.e., there are the $Nb_2O_5$ layer, the $SiO_2$ layer, and the ITO electrically conductive layer which are arranged sequentially above the glass substrate.

It should be noticed that, the exemplary embodiments of the invention may not be limited to the index matching layer comprising the $Nb_2O_5$ layer and the $SiO_2$ layer, and other index matching layers, which are already known or will appear in future, may also be adopted, provided that such other index matching layers may solve the technical problems mentioned by the exemplary embodiments of the invention and achieve the technical purpose thereof.

In specific usage, the peelable adhesive is provided with a thickness of 20-40 μm, the $Nb_2O_5$ layer is provided with a thickness of 5-15 nm, the $SiO_2$ layer is provided with a thickness of 40-60 nm, and the ITO layer is provided with a thickness of 10-40 nm.

In an exemplary embodiment, the peelable adhesive is for example formed on the glass substrate or a surface of the film layer(s) by screen printing. In an exemplary embodiment, the $Nb_2O_5$ layer, the $SiO_2$ layer, and the ITO electrically conductive layer are formed on the glass substrate or a surface of the film layer(s) by magnetron sputtering; to be specific, due to the existence of the peelable adhesive, a low-temperature sputtering is typically used. By controlling the respective thickness of individual film layers precisely and accurately, it is possible that the areas on the glass substrate which are not printed with the peelable adhesive may be formed as a laminated structure by the etching process of the ITO layer, which laminated structure has a ITO area and a ITO-free both being similar in respective reflectivity, such that a shadow elimination effect is obtained.

Exemplary embodiments of the present disclosure will be described hereinafter in detail with reference to the attached drawings, wherein the like reference numerals refer to the like components or structures.

Exemplary Embodiment I

Figure 2:
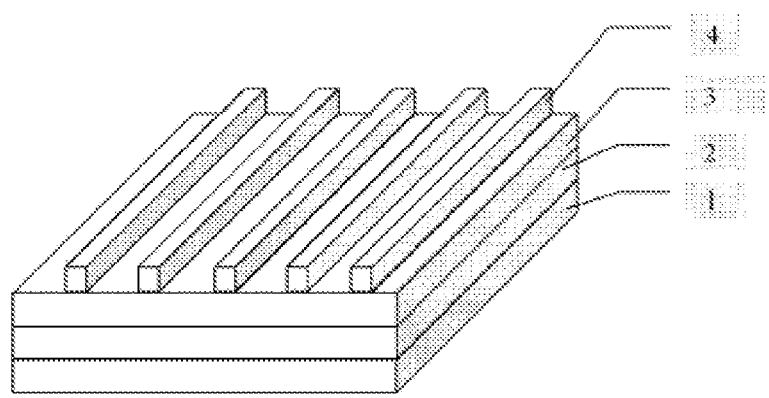
FIG. 2 illustrates a schematic structural view of a laminated structure formed (after the etching process of ITO) at the areas which are not printed with the peelable adhesive, on the glass substrate, according to an exemplary embodiment of the invention, the laminated structure comprising a $Nb_2O_5$ layer and a $SiO_2$ layer and both layers being not peeled away so as to function as an index matching layer.
Figure 3:
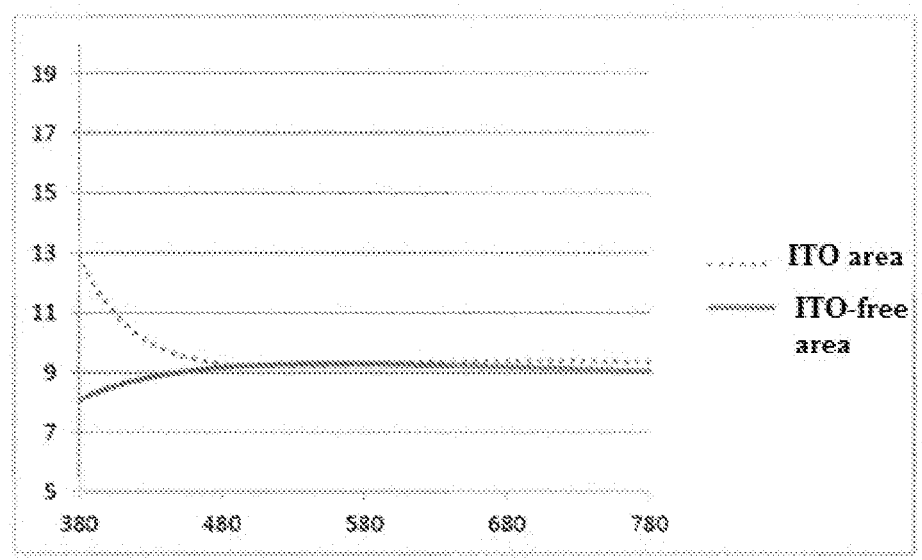
FIG. 3 illustrates a graph of a reflectivity comparison between an ITO area and an ITO-free area in the laminated structured as illustrated in FIG. 2.
Figure 4:
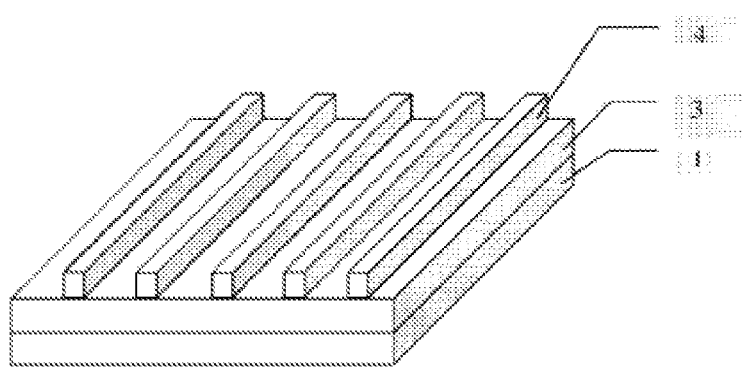
FIG. 4 illustrates a schematic structural view of a laminated structure formed (after the etching process of ITO) at the areas which are printed with the peelable adhesive, on the glass substrate, according to an exemplary embodiment I of the invention, the corresponding $Nb_2O_5$ layer being removed by peeling away the peelable adhesive.
Figure 5:
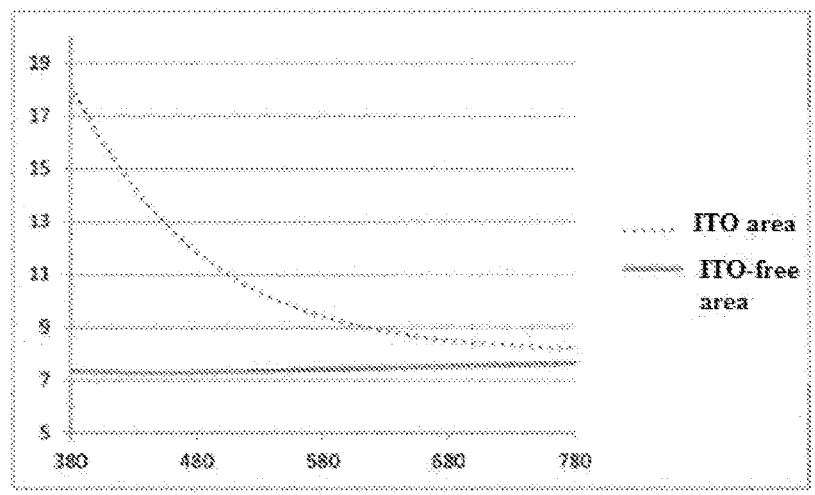
FIG. 5 illustrates a graph of a reflectivity comparison between an ITO area and an ITO-free area in the laminated structured as illustrated in FIG. 4.

Referring to FIGS. 1-5, a method for manufacturing a touch sensor having a single ITO layer according to an exemplary embodiment I of the invention is illustrated, with specific steps as below:

1) rinsing the glass substrate 1, followed by printing the peelable adhesive at sites corresponding to the sensor cutting marks 5 and various sensor binding regions 6 on the glass substrate 1, and then followed by performing a drying processing on the peelable adhesive, e.g., the peelable adhesive may be roasted, its result being illustrated in FIG. 1;

2) performing a rinsing process on the glass substrate after the aforementioned step 1), during which rinsing process, pure water rinsing is performed by a flat plate cleaning apparatus, rather than scrubbing, so as to avoid any destruction of the peelable adhesive layer (not illustrated) printed on the glass substrate 1; followed by placing the rinsed glass substrate 1 into a vacuum coating apparatus so as to coat the $Nb_2O_5$ layer 2. Upon the coating of the $Nb_2O_5$ layer 2, a low-temperature process is adopted with its process temperature being controlled at 150° C. so as to avoid any destruction of the peelable adhesive;

3) peeling away the peelable adhesive layer, e.g., by a double-sided adhesive or manually, after the coating of the $Nb_2O_5$ layer 2 is completed; followed by placing the glass substrate 1 into the flat plate cleaning apparatus to perform a scrubbing process;

4) placing the glass substrate 1 into the coating apparatus to coat the $SiO_2$ layer 3 and the ITO layer 4;

5) etching the ITO layer 4. The laminated structure of the touch sensor region formed after etching is illustrated in FIG. 2. And referring to the test results as illustrated in FIG. 3, the ITO area and the ITO-free area both are similar in respective reflectivity, such that etched circuits of ITO are invisible, resulting in a shadow elimination effect. And as to the laminated structure at the sensor cutting marks 5 and the sensor binding regions 6, as illustrated in FIG. 4, since the $Nb_2O_5$ layer 2 is at least partially removed at portions of the index matching layer corresponding to the sensor cutting marks and sensor binding regions via the peelable adhesive, resulting in lack of the $Nb_2O_5$ layer 2 of the partially removed index matching layer in the laminated structure at the sensor cutting marks 5 and the binding regions 6, without providing shadow elimination effect here, such that there is a significant difference in the reflectivity between an ITO area and an ITO-free area, as illustrated by the test results in FIG. 5, thereby highlighting the sensor cutting marks 5 and the sensor binding regions 6 made from ITO and failing to introduce difficulty in identifying of the cutting marks and binding alignment.

Exemplary Embodiment II

Figure 6:
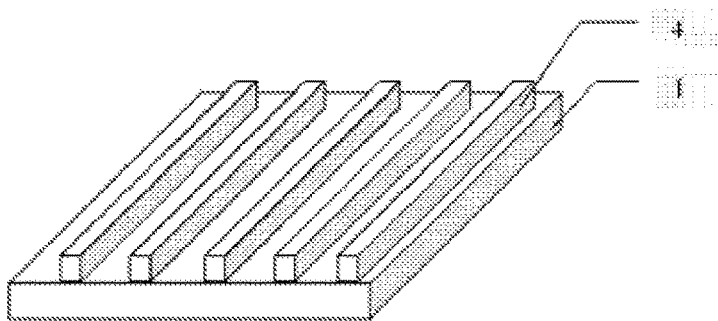
FIG. 6 illustrates a schematic structural view of a laminated structure formed (after the etching process of ITO) at the areas which are printed with the peelable adhesive, on the glass substrate, according to an exemplary embodiment II of the invention, the corresponding $Nb_2O_5$ layer and $SiO_2$ layer being removed by peeling away the peelable adhesive.
Figure 7:
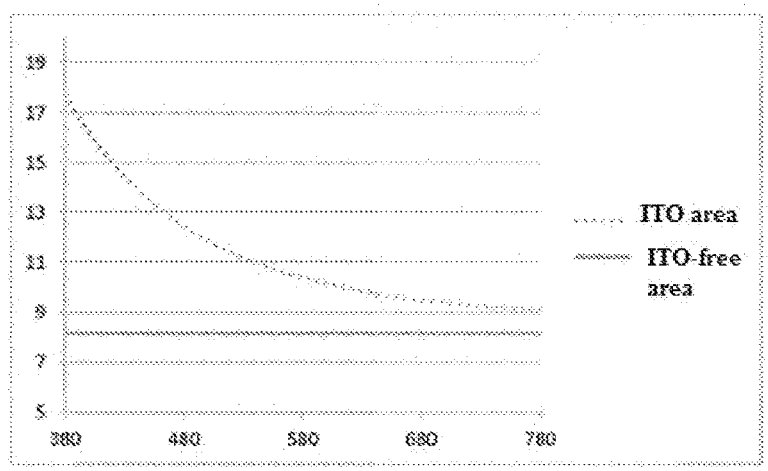
FIG. 7 illustrates a graph of a reflectivity comparison between an ITO area and an ITO-free area in the laminated structured as illustrated in FIG. 6.

Referring to FIGS. 1-3 and 6-7, a method for manufacturing a touch sensor having a single ITO layer according to an exemplary embodiment II of the invention is illustrated, with specific steps as below:

1) rinsing the glass substrate 1, followed by printing the peelable adhesive at sites corresponding to the sensor cutting marks 5 and various sensor binding regions 6 on the glass substrate 1, and then followed by performing a drying processing on the peelable adhesive, e.g., the peelable adhesive may be roasted, its result being illustrated in FIG. 1;

2) performing a rinsing process on the glass substrate 1 after the aforementioned step 1), during which rinsing process, pure water rinsing is performed by a flat plate cleaning apparatus, rather than scrubbing, so as to avoid any destruction of the peelable adhesive layer (not illustrated) printed on the glass substrate 1; followed by placing the rinsed glass substrate 1 into a vacuum coating apparatus so as to coat the $Nb_2O_5$ layer 2 and the $SiO_2$ layer 3 successively. Upon the coating of the $Nb_2O_5$ layer 2 and the $SiO_2$ layer 3, a low-temperature process is adopted with its process temperature being controlled at 150° C. so as to avoid any destruction of the peelable adhesive;

3) peeling away the peelable adhesive layer, e.g., by a double-sided adhesive or manually, after the coating of the $Nb_2O_5$ layer 2 and the $SiO_2$ layer 3 is completed; followed by placing the glass substrate 1 into the flat plate cleaning apparatus to perform a scrubbing process;

4) placing the glass substrate 1 into the coating apparatus to coat the ITO layer 4; and followed by etching the ITO layer 4 after the coating thereof so as to obtain a desired pattern of a single-layered multi-point touch sensor. The laminated structure of the touch sensor region formed after etching is illustrated in FIG. 2. And referring to the test results as illustrated in FIG. 3, the ITO area and the ITO-free both are similar in respective reflectivity, such that etched circuits of ITO are invisible, resulting in a shadow elimination effect. And as to the laminated structure at the sensor cutting marks 5 and the sensor binding regions 6, as illustrated in FIG. 6, since the $Nb_2O_5$ layer 2 and the $SiO_2$ layer 3 are at least partially removed at portions of the index matching layer corresponding to the sensor cutting marks and sensor binding regions via the peelable adhesive, resulting in lack of the $Nb_2O_5$ layer 2 and the $SiO_2$ layer 3 of the partially removed index matching layer in the laminated structure at the sensor cutting marks 5 and the binding regions 6, without providing shadow elimination effect here, such that there is a significant difference in the reflectivity between an ITO area and an ITO-free area, as illustrated by the test results in FIG. 5, highlighting the sensor cutting marks 5 and the sensor binding regions 6 made from ITO and failing to introduce difficulty in identifying of the cutting marks and binding alignment.

Exemplary Embodiment III

Figure 8:
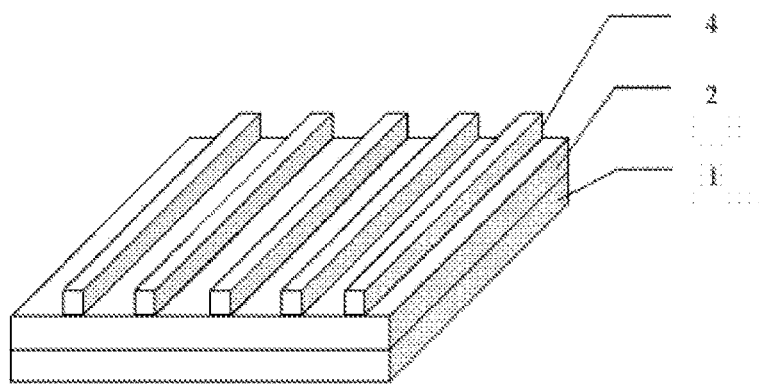
FIG. 8 illustrates a schematic structural view of a laminated structure formed (after the etching process of ITO) at the areas which are printed with the peelable adhesive, on the glass substrate, according to an exemplary embodiment III of the invention, the corresponding $SiO_2$ layer being removed by peeling away the peelable adhesive.
Figure 9:
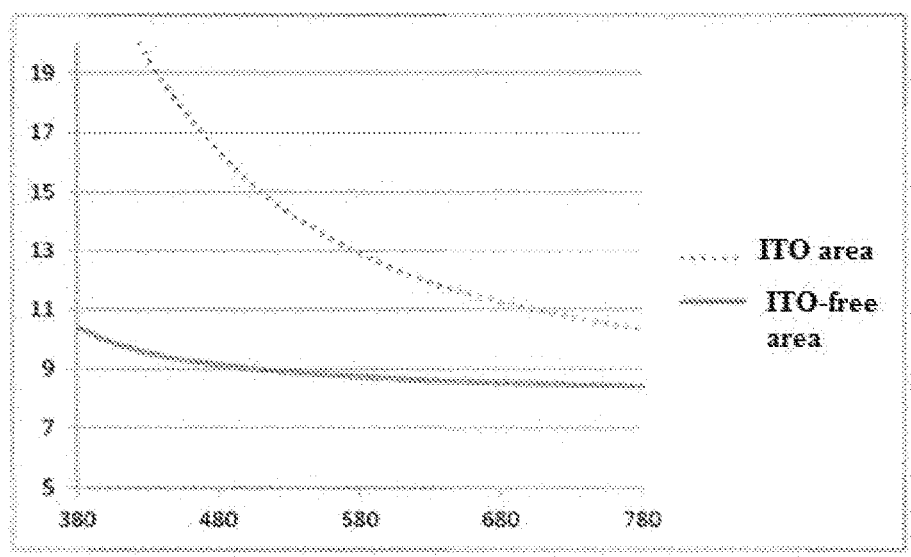
FIG. 9 illustrates a graph of a reflectivity comparison between an ITO area and an ITO-free area in the laminated structured as illustrated in FIG. 8.

Referring to FIGS. 1-3 and 8-9, a method for manufacturing a touch sensor having a single ITO layer according to an exemplary embodiment III of the invention is illustrated, with specific steps as below:

1) rinsing the glass substrate 1, followed by coating the $Nb_2O_5$ layer 2 above all. Since there is no peelable adhesive for such $Nb_2O_5$ layer 2, high-temperature or low-temperature coating is available;

2) placing the glass substrate 1 into a flat plate cleaning apparatus for performing a rinsing process thereon, after the coating of the $Nb_2O_5$ layer 2 is completed, followed by printing the peelable adhesive thereon (not illustrated), and then followed by performing a drying processing on the peelable adhesive, e.g., the peelable adhesive may be roasted;

3) performing a pure water rinsing process on the printed glass substrate 1, followed by placing the rinsed glass substrate 1 into a coating apparatus so as so to coat the $SiO_2$ layer 3 successively. Upon the coating of the $SiO_2$ layer 3, due to the existence of the peelable adhesive for such $SiO_2$ layer 3, a low-temperature coating process is adopted;

4) peeling away the peelable adhesive layer manually (e.g., the peelable adhesive is a double-sided adhesive), after the coating of the $SiO_2$ layer 3 is completed; followed by placing the glass substrate 1 into the cleaning apparatus to perform a scrubbing process;

5) placing the glass substrate 1 into the coating apparatus to prepare the ITO layer 4 after the scrubbing process, and followed by etching the ITO layer 4 after the coating thereof so as to obtain a desired pattern of a single-layered multi-point touch sensor. The laminated structure of the touch sensor region formed after etching is illustrated in FIG. 2. And referring to the test results as illustrated in FIG. 3, the ITO area and the ITO-free area both are similar in respective reflectivity, such that etched circuits of ITO are invisible, resulting in a shadow elimination effect. And as to the laminated structure at the sensor cutting marks 5 and the sensor binding regions 6, as illustrated in FIG. 8, since the $SiO_2$ layer 3 is at least partially removed at portions of the index matching layer corresponding to the sensor cutting marks and sensor binding regions via the peelable adhesive, resulting in lack of the $SiO_2$ layer 3 of the partially removed index matching layer in the laminated structure at the sensor cutting marks 5 and the binding regions 6, without providing shadow elimination effect here, such that there is a significant difference in the reflectivity between an ITO area and an ITO-free area, as illustrated by the test results in FIG. 9, highlighting the sensor cutting marks 5 and the sensor binding regions 6 made from ITO and failing to introduce difficulty in identifying of the cutting marks and binding alignment.

As illustrated in the above three exemplary embodiments, e.g., by introducing processes of printing and peeling away the peelable adhesive, the index matching layer corresponding to the sites of the sensor cutting marks 5 and the binding regions 6 is thus incomplete, i.e., lacking in the $Nb_2O_5$ layer 2 and/or the $SiO_2$ layer 3. As such, the index matching layer of other sites is maintained intact while the sites of the sensor cutting marks 5 and the binding regions 6 have no shadow elimination effect, highlighting the sensor cutting marks 5 and the sensor binding regions 6 and failing to introduce difficulty in alignment during cutting and binding.

Furthermore, in the above three exemplary embodiments, the peelable adhesive is printed by screen printing, with a thickness of 20-40 μm. The temperature for roasting the peelable adhesive is controlled at around 150° C. The $Nb_2O_5$ layer 2 and the $SiO_2$ layer 3 are coated by medium frequency magnetron reaction sputtering, and the ITO layer 4 is coated by direct current magnetron sputtering. By way of example, the $Nb_2O_5$ layer 2 is provided with a thickness of 5-15 nm, the $SiO_2$ layer 3 is provided with a thickness of 40-60 nm, and the ITO layer 4 is provided with a thickness of 10-40 nm.

Besides, according to the general inventive concept of the invention, it is provided a touch sensor having a single ITO layer, the touch sensor being manufactured by the method described by the aforementioned exemplary embodiments, wherein portions of the index matching layer corresponding to a sensor cutting mark and sensor binding regions are at least partially removed. And it is also provided a touch screen, comprising the touch sensor having a single ITO layer as mentioned above.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although the disclosure is described in view of the attached drawings, the embodiments disclosed in the drawings are only intended to illustrate the preferable embodiment of the present invention exemplarily, and should not be deemed as a restriction thereof.

Although several exemplary embodiments of the general concept of the present invention have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

LIST OF REFERENCE NUMERALS 1 glass substrate
2 $Nb_2O_5$ layer
3 $SiO_2$ layer
4 ITO layer
5 sensor cutting mark
6 sensor binding region

What is claimed is:

1. A method for manufacturing a touch sensor having a single ITO layer, comprising steps of:
    performing cleaning processing on a glass substrate;
    forming a pattern of an index matching layer on the glass substrate, comprising:
        forming an entire indexing matching layer across the glass substrate, and a peelable adhesive at sites corresponding to sensor cutting marks and sensor binding regions on the glass substrate or the index matching layer; and
        then at least partially removing portions of the index matching layer corresponding to the sensor cutting marks and the sensor binding regions being at least partially removed, by peeling away the peelable adhesive;
    forming an ITO layer on the partially removed index matching layer; and
    etching the ITO layer so as to form a pattern of the single ITO layer of the touch sensor.

2. The method according to claim 1, wherein the index matching layer comprises a $Nb_2O_5$ layer and a $SiO_2$ layer.

3. The method according to claim 2, wherein the step of forming the pattern of the index matching layer further comprises:
    forming the peelable adhesive at sites corresponding to the sensor cutting marks and the sensor binding regions on the glass substrate, and performing drying processing on the peelable adhesive;
    forming the $Nb_2O_5$ layer on the glass substrate on which the peelable adhesive is formed;
    peeling away the peelable adhesive so as to remove partially portions of the $Nb_2O_5$ layer corresponding to the sensor cutting marks and the sensor binding region; and
    forming the $SiO_2$ layer on the partially removed $Nb_2O_5$ layer.

4. The method according to claim 2, wherein the step of forming the pattern of the index matching layer further comprises:
    forming the peelable adhesive at sites corresponding to the sensor cutting marks and the sensor binding regions on the glass substrate, and performing drying processing on the peelable adhesive;
    forming the $Nb_2O_5$ layer on the glass substrate on which the peelable adhesive is formed;
    forming the $SiO_2$ layer on the $Nb_2O_5$ layer; and
    peeling away the peelable adhesive so as to remove partially portions of the $Nb_2O_5$ layer and the $SiO_2$ layer corresponding to the sensor cutting marks and the sensor binding region.

5. The method according to claim 2, wherein the step of forming the pattern of the index matching layer further comprises:
    forming the $Nb_2O_5$ layer on the glass substrate;

forming the peelable adhesive at sites corresponding to the sensor cutting marks and the sensor binding regions on the $Nb_2O_5$ layer, and performing drying processing on the peelable adhesive;

forming the $SiO_2$ layer on the $Nb_2O_5$ layer on which the peelable adhesive if formed; and peeling away the peelable adhesive so as to remove portions of the $SiO_2$ layer corresponding to the sensor cutting marks and the sensor binding region.

6. The method according to claim 2, wherein the peelable adhesive is provided with a thickness of 20-40 μm, the $Nb_2O_5$ layer is provided with a thickness of 5-15 nm, the $SiO_2$ layer is provided with a thickness of 40-60 nm, and the ITO layer is provided with a thickness of 10-40 nm.

7. The method according to claim 1, wherein the peelable adhesive is formed by screen printing.

8. The method according to claim 3, wherein the step of peeling away the peelable adhesive further comprises peeling away the peelable adhesive manually.

9. The method according to claim 4 wherein the step of peeling away the peelable adhesive further comprises peeling away the peelable adhesive manually.

10. The method according to claim 2, wherein the $Nb_2O_5$ layer and the $SiO_2$ layer are formed by medium frequency magnetron reaction sputtering, and the ITO layer is formed by direct current magnetron sputtering.

11. A touch sensor having a single ITO layer, the touch sensor being manufactured by the method according to claim 1, wherein portions of the index matching layer corresponding to sensor cutting marks and sensor binding regions are at least partially removed.

12. A touch screen, comprising the touch sensor having a single ITO layer according to claim 11.

13. The method according to claim 5, wherein the step of peeling away the peelable adhesive further comprises peeling away the peelable adhesive manually.

14. The method according to claim 3, wherein the peelable adhesive is chosen as a double-sided adhesive.

15. The method according to claim 4, wherein the peelable adhesive is chosen as a double-sided adhesive.

16. The method according to claim 5, wherein the peelable adhesive is chosen as a double-sided adhesive.

* * * * *